(12) United States Patent
Hennig et al.

(10) Patent No.: US 6,698,482 B2
(45) Date of Patent: Mar. 2, 2004

(54) ROTARY AIR CONNECTION WITH BEARING FOR TIRE INFLATION SYSTEM

(75) Inventors: Mark Kevin Hennig, Corpus Christi, TX (US); John Henry Stewart, Natalia, TX (US)

(73) Assignee: Equalaire Systems, Inc., Corpus Christi, TX (US)

( * ) Notice: Subject to any disclaimer, the term of this patent is extended or adjusted under 35 U.S.C. 154(b) by 3 days.

(21) Appl. No.: 10/186,951

(22) Filed: Jul. 1, 2002

(65) Prior Publication Data

US 2004/0000364 A1 Jan. 1, 2004

(51) Int. Cl.[7] .............................................. B60B 23/00
(52) U.S. Cl. ....................................... 152/417; 152/415
(58) Field of Search ................................... 152/415, 417

(56) References Cited

U.S. PATENT DOCUMENTS

| | | | |
|---|---|---|---|
| 5,584,949 A | * 12/1996 | Ingram | ........................ 152/417 |
| 5,769,979 A | 6/1998 | Naedler | |
| 5,947,172 A | * 9/1999 | Glotin | ........................ 141/383 |
| 6,105,645 A | * 8/2000 | Ingram | ........................ 152/415 |
| 6,131,631 A | * 10/2000 | Bradley et al. | ............. 152/417 |
| 6,145,559 A | * 11/2000 | Ingram, II | ................... 152/417 |
| 6,435,238 B1 | * 8/2002 | Hennig | ....................... 152/417 |

* cited by examiner

Primary Examiner—Russell D. Stormer
(74) Attorney, Agent, or Firm—Fulbright & Jaworski

(57) ABSTRACT

An improved rotary air connection in an automatic tire inflation system for supplying air to rotating tires through an elongate rigid tubular member supported from and adapted to move longitudinally and rotationally in first and second seals. The rotary air connection includes a bearing adapted to engage a shoulder on the tubular member to limit longitudinal movement of the tubular member. The bearing may also coact with the shoulder for limiting transverse movement of the tubular member.

9 Claims, 5 Drawing Sheets

ROTARY AIR CONNECTION WITH BEARING FOR TIRE INFLATION SYSTEM

BACKGROUND OF THE INVENTION

The present invention is directed to an improvement in an automatic tire inflation system (ATIS) in which the air for rotating tires is transmitted through an air connection between the air supply and each of the tires. In particularly, the present invention is directed to an improved rotary air connection having a bearing.

A rotary air connection provides a connection between a stationary air supply to each of the rotating tires. However, manufacturing tolerances allow out-of-round conditions which can consequently cause extensive wear and stress on rotary air connections. It is known, as described in U.S. Pat. No. 5,769,979 to provide an improved rotary air connection which allows for misalignment and movement between the rotating and stationary parts of an air connection. However, in some cases in such a system the elongate, rigid tubular member which communicates air from the air supply to the tee body is supported on first and second seals and is capable of longitudinal and rotational movement in the seals. It has been found that in some cases the tubular member moves and engages the tee body creating damage therebetween. In systems designed to work over 100,000 miles, this may cause failures.

BRIEF SUMMARY OF THE INVENTION

The present invention is directed to an improved rotary air connection in a tire inflation system having a movable tubular member supported in first and second seals by providing a bearing coacting with a shoulder on the tubular member. The provision of such a bearing installed between the tee body and the tubular member will provide a smooth, self-lubricating, lubricating and wear resistant surface.

Still a further object of the present invention is wherein the bearing is supported from the tee body in the hub cap and engages a shoulder preferably positioned on one end of the tubular member.

A further object of the present invention is wherein the bearing coacts with the shoulder limiting axial movement of the tubular member.

A further object of the present invention is wherein the bearing includes an air passageway therethrough.

Still a further object of the present invention is wherein the bearing includes parallel flat sides and the shoulder is positioned at the first end of the tubular member and engages one side of the bearing.

Still a further object of the present invention is wherein the bearing coacts with the shoulder limiting transverse movement of the tubular member.

Yet a further object of the present invention is wherein the shoulder includes a curved convex flared flange at the first end of the tubular member and the bearing includes a curved portion engaging the convex flared flange thereby limiting the longitudinal movement of the tubular member and also axially aligning the tubular member in the tee body by preventing transverse movement of the tubular member.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawings, in which.

DETAILED DESCRIPTION OF THE INVENTION

Figure 1:
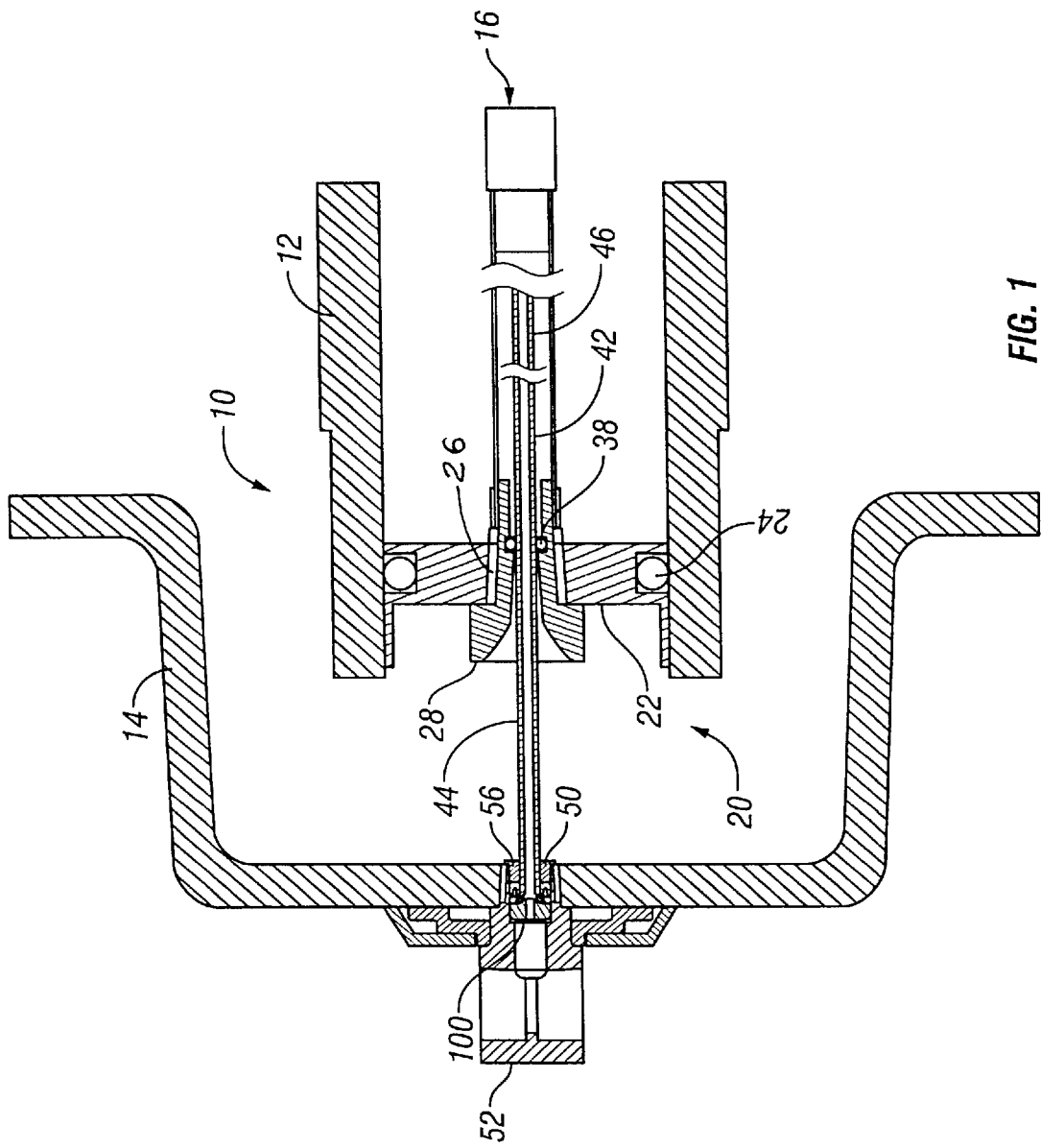
FIG. 1 is an elevational view, in cross section, of the rotary air connection of the present in a tire inflation system.
Figure 2:
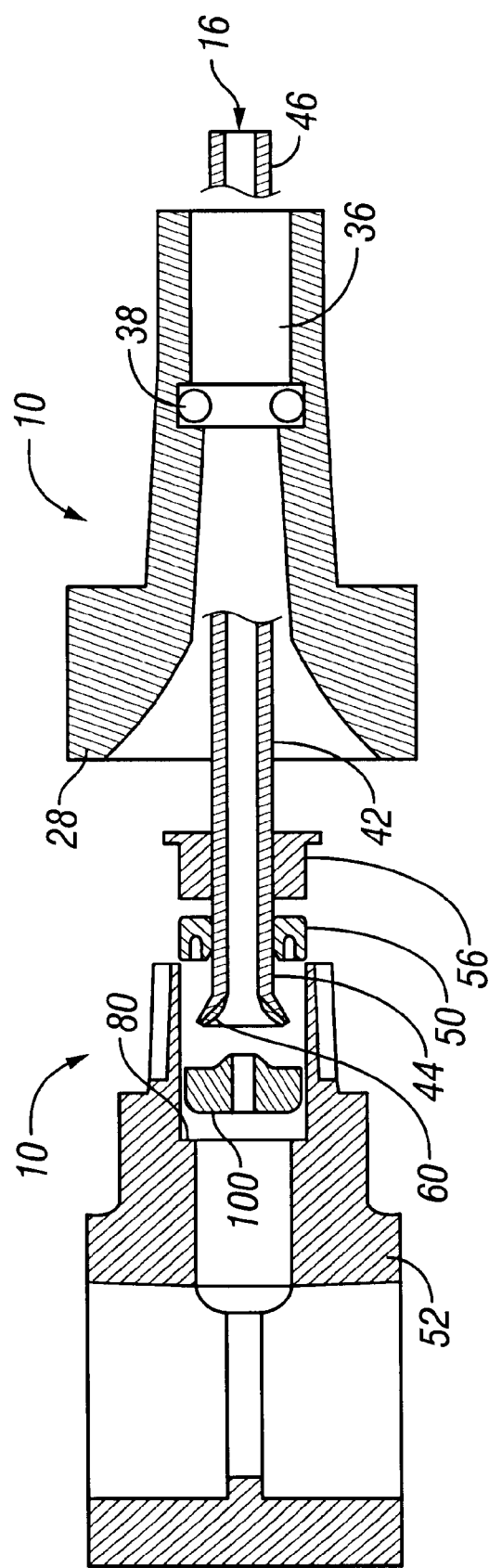
FIG. 2 is an enlarged exploded view similar to FIG. 1 in which the air in separate parts.

Referring now to FIGS. 1 and 2, the reference numeral 10 generally indicates the rotary air connection of the present invention for supplying air from an air supply on a truck trailer in an automatic tire inflation system for a vehicle to the rotating tires. The numeral 12 generally indicates one axle or spindle of a trailer having one or more axles with wheels having one or more tires at one end, a hub cap 14 at each end of the axle 12 for retaining lubricant in the wheel bearings and an air supply 16 either directly in the axle 12, or through an interior conduit (not shown) in the inside of the axle 12, for supplying air to the rotary air connection through the inside of the axle, such as described in U.S. Pat. No. 5,584,949, which for a fuller disclosure is incorporated herein by reference.

A pneumatic rotary union generally indicated by the reference numeral 20 is supported and positioned in the center of each end of the axle 12, such as in a force fit plug 22, such as shown in U.S. Pat. No. 6,131,631, which seatingly engages the interior of the axle 12 by a seal 24 if air is injected directly into the inside of the axle 12, and in turn is sealed from the exterior of the rotary union 20 by a sealed connection 26.

Referring still to FIGS. 1 and 2, the union 20 has a first stationary part 28 having a passageway 36 therethrough. The passageway 36 is in communication with the air supply 16 injected directly into the interior of the axle 12 or to a supply conduit (not shown). A first resilient stationary rotary seal 38 is supported in the passageway 36 and encircles the passageway 36. The rotary seal may be any suitable seal and any suitable material and a lip tight seal of NITRILE is satisfactory; although a conventional O-ring may be used.

The union 20 includes a second rotatable part including an elongate rigid tubular member 42, preferably metal, having a first end 44 and a second end 46. The second end 46 is coaxially extendable through and is longitudinally and rotationally movable in the passageway 36 and sealably engages the rotary seal 38 and is in communication with the air supply 16. The first end 44 of the tubular member 42 is sealably connected to the air connection or tee body 52 on the hub cap 44 through a seal 50. The seal 50 may be of any suitable dynamic seal allowing axially and rotational movement of the end 44, such as a lip seal or O-ring seal and is held in place by the telescope cap 56. An air connection 52 or tee body is provided on the hub cap 14 for connection to the tire or tires at the end of the axle 12. The end 44 of the tubular member 42 includes a shoulder 60 which in commercial use is a convex flange.

In operation, air 16 is supplied through the stationary part 28 of the rotary union 20. The hub cap 14 rotates with the wheels and relative to the tubular member 42. The tubular member 42 is movable in the seals 38 and 50, compensating for any misalignment between the rotatable cap 14 and the stationary part 22 of the union 20. The above-named description is generally disclosed in U.S. Pat. No. 5,769,979.

However, it was found that some instances it was possible for the elongate metal tubular member 42 to move to a position wherein its first end 44 engages and rotates against an internal flange 80 of the air connection 52. This creates damage to the rotary air connection 52 and/or the elongate tubular member 42.

The present invention is directed to the provision of a bearing 100 (FIGS. 1–5)which coacts with the shoulder 60 limiting the longitudinal or axial movement of the tubular member 42 and preventing the shoulder 60 from engaging the internal flange 80 on the air connection or tee body 52. The introduction of the bearing 100 will provide a smooth, self-lubricating and wear resistant surface. The bearing 100 may be of any suitable material such as a molybelenum impregnated nylon material. It is to be noted that the bearing 100 is supported from the hub cap 14 by the air connection 52 and thus even if the hub cap 14 is out-of-round relative to the axle 12, the bearing 100 will maintain its position in the hub cap 14. The bearing 100 includes an air passageway 104 therethrough.

Figure 3:
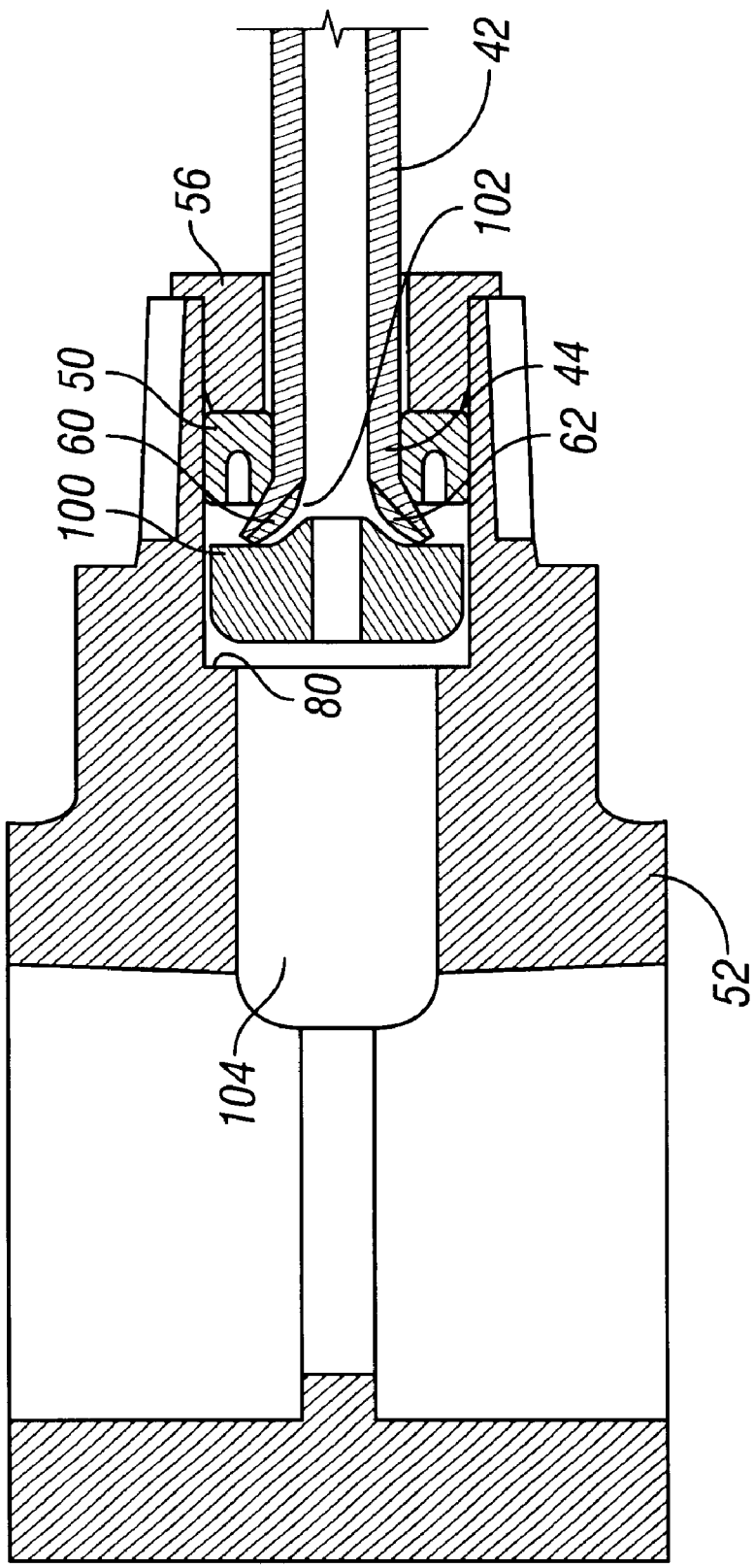
FIG. 3 is an enlarged elevational and fragmentary view of the rotary air connection of FIGS. 1 and 2 showing the coaction of a bearing with the elongate tubular member in the preferred embodiment FIG. 4 an enlarged elevational view of the bearing shown in FIGS. 1–3.
Figure 4:
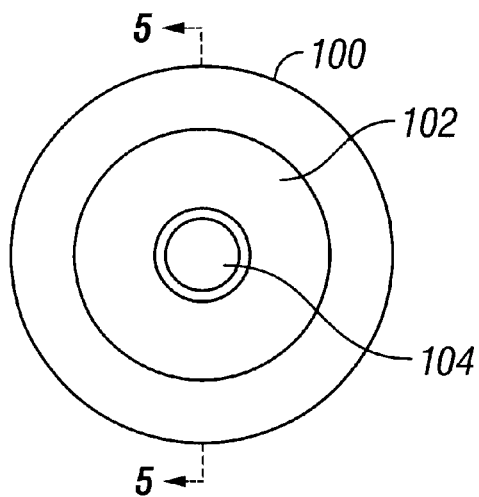
Figure 5:
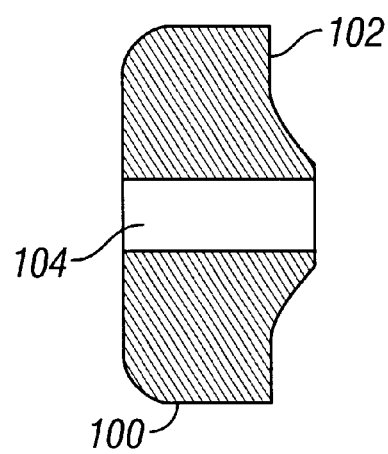
FIG. 5 a cross-sectional view taken along the line 5—5 of FIG. 4.

Referring now to FIGS. 3, 4 and 5, it is to be noted that the shoulder 60 at the end 44 of the elongate tubular member 42 provides a curved, convex flared flange 62 and the bearing 100 includes a curved portion 102 having a concave shape which engages the surface 62 the flange 60. This coaction between the bearing 100 and the flange 60 limits the axial movement of the end 44 of the tubular member 42 and also aligns the end 44 of the tubular member 42 to the center of the rotating hub cap 14. Therefore, in the preferred embodiment of the bearing 100, the first end of the elongate tubular member 42 is longitudinally and transversely engaged and aligned limiting its axial movement, preventing wear and tear between the tubular member 42 and the air connection 52 as well as compensating for any transverse or off-the-center rotation of the hub cap 14.

Other and further embodiments may be shown such as shown in FIGS. 6–12 wherein like parts to those shown in FIGS. 1–5 are similarly numbered with the addition of the suffix "a","b"and "c".

Figure 6:
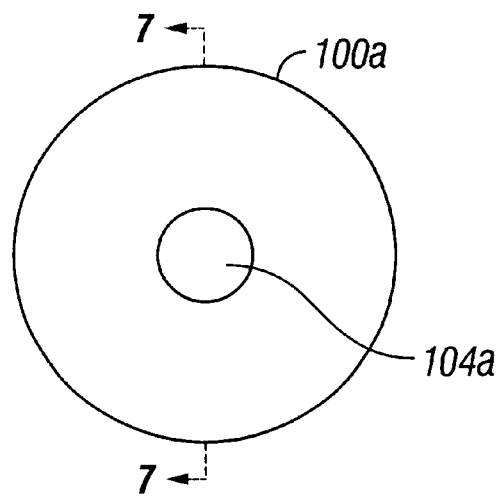
FIG. 6 an enlarged elevational view of another embodiment of a suitable bearing.
Figure 7:
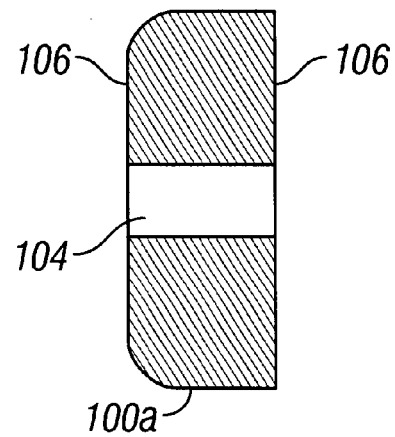
FIG. 7 is a cross-sectional view taken along the line 7—7 of FIG. 6.

The bearing 100a, as best seen in FIGS. 6 and 7, is a circular bearing having flat sides 106. The sides 106 are parallel flat sides and one of the sides engages the flange 60 at the end 44 of the elongate tubular member 42. This bushing 100a serves to limit the longitudinal movement of the tubular member 42 from engaging and wearing upon the internal flange 80 of the air connection 52. While bushing 100a does not transversely align the tubular member 42, it does provide an inexpensive bushing which overcomes the contact of the member 42 and flange 80.

Figure 8:
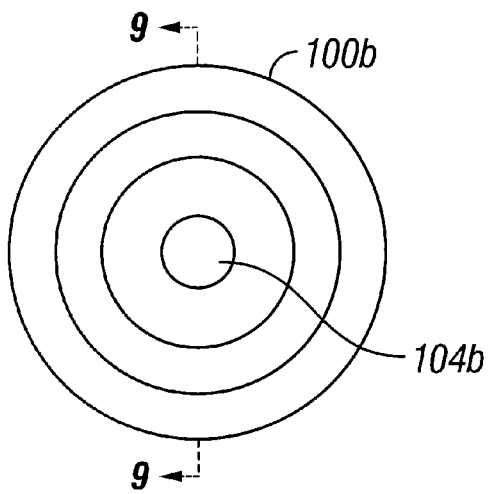
FIG. 8 is an enlarged elevational view of still another embodiment of a bearing of the present invention.
Figure 9:
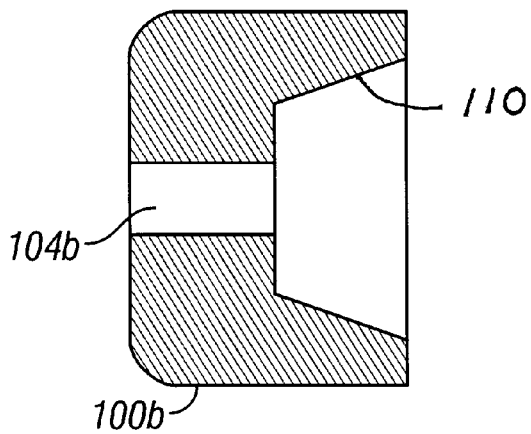
FIG. 9 cross-sectional view taken along the line 9—9 of FIG. 8.

Referring now to FIGS. 8 and 9, a bearing 100b is shown which includes a counterbore 110 for receiving the flange or shoulder 60 of end 44 of the tubular member 42. Preferably, the counterbore 110 is tapered inwardly from one side 106b aligning the end 44.

Figure 10:
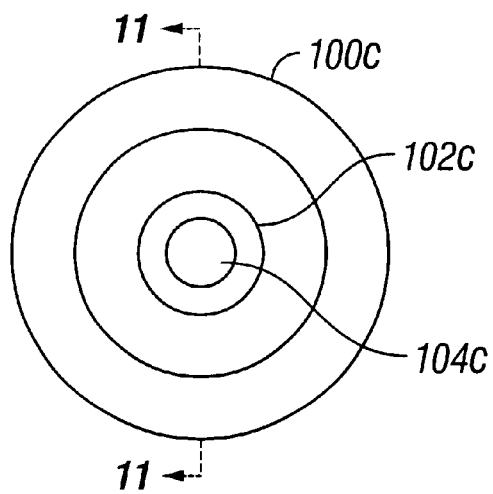
FIG. 10 is an enlarged elevational view of yet another embodiment of the present invention.
Figure 11:
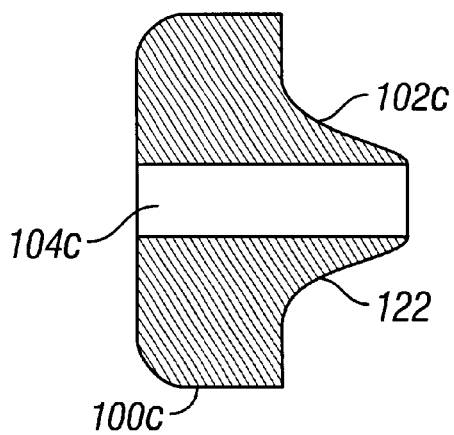
FIG. 11 a cross-sectional view taken along line 11 of FIG. 10.

Referring now to FIGS. 10–11, a still further embodiment of a bushing 100c is shown. In this embodiment, a ball 120 and socket 122 connection is provided between the bearing 100c and the tubular member 42c , here shown with the ball on the member 42c , being, 60, and the socket 122 being on the bearing 100c although the connection could be reversed.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. In an air inflation system for a vehicle having at least one axle with at least one wheel having a pneumatic line at each end of the axle and said vehicle having an air supply supplying air to the inside of the axle and a hub cap at each end of the axle, a pneumatic rotary union supported and positioned in the center of each end of the axle, said union having a first stationary part having a passageway therethrough, said passageway being in communication with the air supply, and a first resilient seal supported in the passageway, said union having a second rotatable part including an elongate rigid tubular member having first and second ends, said second end coaxially extendable through and capable of longitudinally and rotatably moving in and sealably engaging the first seal, the first end of the tubular member extendable through and capable of longitudinally and rotatably moving through a second resilient seal connected to the hub cap, the improvement of bearing means for limiting the longitudinal movement of the tubular member comprising, a shoulder on an end of the tubular member, and a bearing coacting with the shoulder limiting longitudinal movement of the tubular member, said bearing being separate from the tubular member and being of a nonmetallic material.

2. The apparatus of claim 1 wherein the bearing is supported from the hub cap.

3. The apparatus of claim 2 wherein the bearing includes an air passageway therethrough.

4. The apparatus of claim 2 wherein the bearing includes parallel flat sides and the shoulder is positioned at the first end of the tubular member and engages one side of the bearing.

5. The apparatus of claim 1 wherein the bearing coacts with the shoulder limiting transverse movement of the tubular member.

6. The apparatus of claim 5 wherein the shoulder is a curved convex flared flange at the first end of the tubular member, and the bearing includes a curved portion engaging the convex flared flange.

7. The apparatus of claim 2 wherein the bearing includes a counterbore for receiving one end of the tubular member.

8. The apparatus of claim 7 wherein the counterbore tapers inwardly from a side.

9. The apparatus of claim 5 including a ball and socket connection between the bearing and the tubular member.

* * * * *